United States Patent
Harbarth et al.

(10) Patent No.: US 8,825,665 B2
(45) Date of Patent: Sep. 2, 2014

(54) DATABASE INDEX AND DATABASE FOR INDEXING TEXT DOCUMENTS

(75) Inventors: Jürgen Harbarth, Darmstadt (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 1177 days.

(21) Appl. No.: 12/314,705

(22) Filed: Dec. 15, 2008

(65) Prior Publication Data

US 2010/0082633 A1   Apr. 1, 2010

(30) Foreign Application Priority Data

Oct. 1, 2008 (EP) .................................... 08017306

(51) Int. Cl.
*G06F 17/30* (2006.01)
*G06F 7/00* (2006.01)

(52) U.S. Cl.
CPC .... *G06F 17/30911* (2013.01); *G06F 17/30622* (2013.01)
USPC ......................................................... 707/742

(58) Field of Classification Search
CPC .................. G06F 17/30613; G06F 17/30619; G06F 17/30622; G06F 17/30911
See application file for complete search history.

(56) References Cited

U.S. PATENT DOCUMENTS

| | | | |
|---|---|---|---|
| 6,859,800 B1 * | 2/2005 | Roche et al. ................... | 707/718 |
| 7,299,404 B2 * | 11/2007 | Agarwal et al. ................ | 715/205 |
| 7,580,957 B2 * | 8/2009 | Azami ................................... | 1/1 |
| 2004/0267722 A1 * | 12/2004 | Larimore et al. ................. | 707/3 |
| 2006/0271565 A1 * | 11/2006 | Acevedo-Aviles et al. ... | 707/100 |
| 2006/0282455 A1 * | 12/2006 | Lee et al. ....................... | 707/102 |
| 2008/0154938 A1 * | 6/2008 | Cheslow ........................ | 707/102 |
| 2009/0063399 A1 * | 3/2009 | Aboulnaga et al. ............... | 707/2 |
| 2009/0193005 A1 * | 7/2009 | Rao et al. ........................... | 707/4 |
| 2010/0106706 A1 * | 4/2010 | Rorex et al. ................... | 707/709 |
| 2010/0171967 A1 * | 7/2010 | Silverbrook et al. .......... | 358/1.5 |
| 2010/0228734 A1 * | 9/2010 | Murthy ......................... | 707/741 |
| 2011/0029557 A1 * | 2/2011 | Raghavan et al. ............. | 707/769 |
| 2012/0047186 A1 * | 2/2012 | Shadmon et al. ............. | 707/803 |

OTHER PUBLICATIONS

GPX—Gardens Point XML IR at INEX 2006; Comparative Evaluation of XML Information Retrieval Systems:, Fuhr et al., Springer Berlin, vol. 4518, Dec. 17, 2006, pp. 137-150.
"Structured Information Retrieval in XML Documents", Kotsakis, Proceedings of the ACM Symposium on Applied Computing, Mar. 10, 2002, pp. 663-667.

* cited by examiner

*Primary Examiner* — Alicia Lewis
(74) *Attorney, Agent, or Firm* — Nixon & Vanderhye, P.C.

(57) ABSTRACT

Certain example embodiments relate to a database index for indexing one or more text documents in a database. The text documents include one or more hierarchical nodes, and each node includes one or more words. The database index includes at least one entry, with each entry including a key. The key, in turn, includes a subset of words occurring in one of the hierarchical nodes of the text documents and the name of the respective hierarchical node. Associated with each key is a value including one or more references to the text documents in which the subset of words occurs.

16 Claims, 1 Drawing Sheet

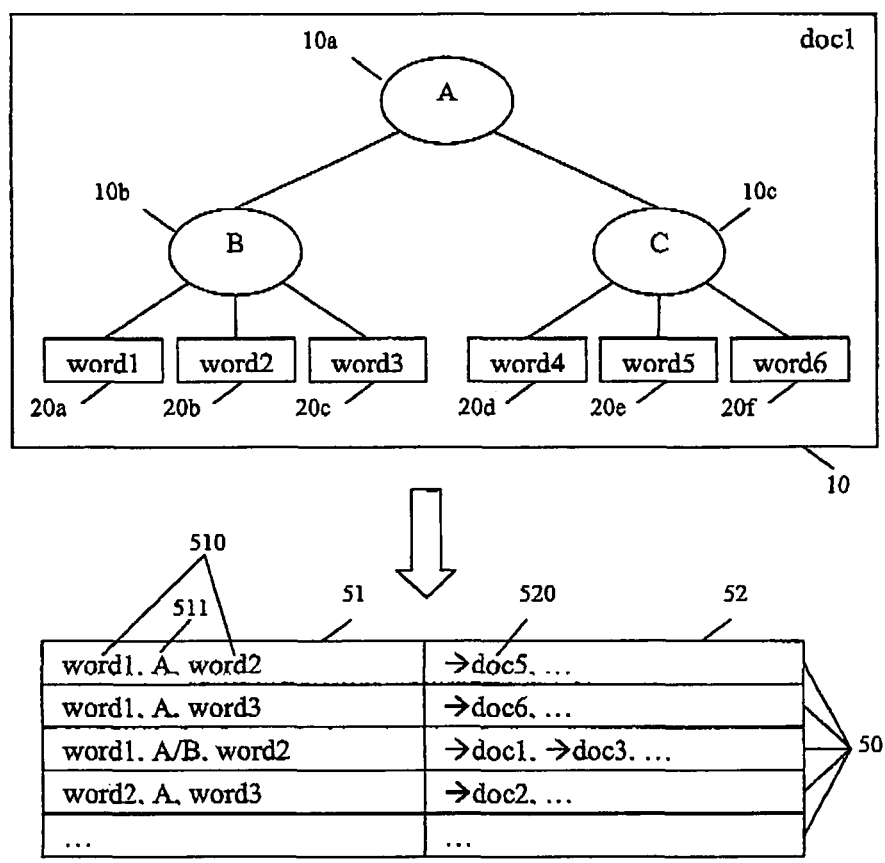

DATABASE INDEX AND DATABASE FOR INDEXING TEXT DOCUMENTS

This application claims priority to European Application No. 08017306.5 filed 1 Oct. 2008, the entire contents of which are hereby incorporated by reference.

TECHNICAL FIELD

The present invention relates to a database index and a database for indexing text documents.

THE PRIOR ART

Today, huge amounts of text documents are typically stored in large databases in order to facilitate an efficient retrieval of the contents of the documents using database query mechanisms. Such documents may be structured and comprise text as well as non-text contents. Native XML databases have become increasingly popular in this context.

In order to efficiently retrieve documents with a specific text from the database, scanning all documents for the searched text is highly inefficient given the possibly huge amount of documents and the large amount of text of each document. In this context, indexes are commonly used. Such indexes typically manifest as lists of key/value-pairs, wherein the keys store the information to be searched and the values store a list of pointers towards documents which contain the searched information. In the context of text document retrieve, the keys typically each store a word comprised in the text of the documents. Maintaining such a text index significantly enhances the performance of queries that search for all documents containing a specific word, which is a common use case.

However, such a prior art index only satisfyingly improves the efficiency of simple queries for text documents which contain a single word anywhere in the document. In more advanced contexts, more complex queries are needed, for example for retrieving documents which contain a number of words with a given distance (e.g. only two consecutive words), contain words in a specific location of the document, or a combination of both, i.e. retrieving a number of words with a given distance in a specific location of the document.

In the prior art approaches are known for designing an index in a manner which facilitates an efficient retrieval in one of the above use cases, but which is rather inefficient in other use cases. Since maintaining multiple indexes in parallel for different types of queries is costly and requires much processing time and storage space, there is a need for a common indexing structure which is efficient in all of the above use cases.

For example the U.S. Pat. No. 7,305,613 discloses a method and an apparatus for indexing structured documents. Among several infrastructure functions such as concurrency control and version control, the document teaches how to generate indexes storing index values according to certain predefined extraction rules. The entries of the generated indexes are preferably stored in a tree-like structure and comprise one indexed word each.

In contrast to improving the processing speed of a given query with the help of an index, whose generation takes place prior to the actual execution of a query, other prior art approaches propose to optimize the query itself at runtime. For example, the U.S. Pat. No. 7,305,414 discloses a method and an apparatus for rewriting database commands containing embedded XML expressions in order to improve the efficiency of query processing. Such queries may also involve indexes. However, how these indexes are structured is outside the scope of the document.

Furthermore, in the field of text retrieval in large document collections, the U.S. Pat. No. 7,305,380 defines a system that limits the search results of a search engine based on context information such as URLs, in order to provide a user with more relevant search results. The system may also involve indexes for executing queries. However, how such indexes are best structured is not discussed. Lastly, the U.S. Pat. No. 7,305,336 discloses a method for summarizing text in documents, in that the method analyzes the text for semantic relationships and compresses the documents by deriving generalizations that summarize parts of the text. However, improving the processing of queries over such texts is not discussed.

It is therefore the technical problem underlying the present invention to improve the efficiency when searching a database for text documents which at least partly overcomes the above explained disadvantages of the prior art.

SUMMARY OF THE INVENTION

This problem is according to one aspect of the invention solved by a database index for indexing one or more text documents in a database, the text documents comprising one or more hierarchical nodes each comprising one or more words. In the embodiment of claim 1, the database index comprises at least one entry, each entry comprising:

a. a key comprising a subset of words occurring in one of the hierarchical nodes of the text documents and the name of the respective hierarchical node; and b. a value comprising one or more references to the text documents in which the subset occurs.

Accordingly, the embodiment defines a database index which stores key/value-pairs as its entries. Each key stores a tuple which comprises a subset of words occurring in one of the hierarchical nodes and the name of the respective node, i.e. it combines text (the subsets of words) and structure (the name of the nodes) information. This enables efficient queries for text documents which comprise certain words in a specific location. To this end, the entries of the database index are scanned for a key which comprises the searched words and the searched node name. If the database index comprises an entry with this key, the corresponding value is obtained. This value references the text documents of the database which comprise the searched words in the searched location. A database index combining text and structure information according to the present invention enables a huge efficiency improvement in multiple use cases, as further outlined in the detailed description below.

In one aspect of the present invention, each key may be ordered by the first word of the subset of words, the name and the remaining words of the subset of words. Accordingly, the keys of the index are in this aspect ordered tuples of the form (w1, A, w2, . . . , wn) with w1, w2, . . . , wn being the indexed words and A being the node comprising these words. The ordering of an index has direct impact on the speed of information retrieval. Ordering an index like illustrated above is especially advantageous, as further explained in the detailed description below.

In another aspect, the entries may be sorted by the first word of the subset of words in alphabetical order, by the name in document order and/or by the remaining words of the subset of words in alphabetical order. Sorting the entries of an index in a certain manner further improves the efficiency of information retrieval, as explained in the detailed description below.

Furthermore, the subset of words in each key may comprise only one word. Accordingly, if for example a node A to be indexed comprises three words w1, w2 and w3, the database index would comprise three entries for the node A whose keys are each built from the subsets {w1}, {w2} and {w3} respectively, each combined with the name "A" as explained above.

Alternatively, the subset of words in each key may comprise at least two words having a predefined distance from each other in the text of the text documents. The distance thus reflects the number of words between two words. In one aspect, the at least two words may be consecutive words, i.e. having a distance of 0. In the above example of a node A with three words w1, w2 and w3, the database index would comprise two entries for this node whose keys comprise the subsets {w1, w2} and {w2, w3}, respectively. The subset {w1, w3} would not be included in the index, since the words w1 and w2 are not consecutive words. Furthermore, it should be noted that if the last word w3 is stored in an entry {w3, .quadrature.}, where .quadrature. is a special end-token, the resulting two-word-index has as many entries as the single-word-index shown further above. Consequently, the effort when inserting a new text document in the database and adding a corresponding entry to the index is the same for both index structures.

In yet another aspect of the present invention, the name in each key may comprise a path of the respective hierarchical node. The path may start from the root node of the text document.

In another aspect, only a part of the hierarchical nodes of the text documents may be indexed. Accordingly, a database index over books of a library may e.g. only index the bibliographic information of the books, but not the full text. Alternatively, all of the hierarchical nodes of the text documents, i.e., the full content, may be indexed.

The present invention also relates to a method for generating any of the database indexes described above, as well as to a computer program comprising instructions for implementing such a method. The computer program, the database, and/or the database index(es) may be stored on a non-transitory computer-readable storage medium or implemented on a processing system, as will be readily appreciated by those skilled in the art.

Furthermore, a database, especially an XML database, being adapted for storing XML documents is provided comprising at least one database index as described above. Such a database may further comprise a structure index, as e.g. defined in the U.S. Pat. No. 7,051,016 of Applicant.

SHORT DESCRIPTION OF THE DRAWINGS

In the following detailed description, presently preferred embodiments of the invention are further described with reference to the following figures:

FIG. 1: An exemplary text document comprising three hierarchical nodes and a database index according to an embodiment of the present invention;

DETAILED DESCRIPTION

In the following, presently preferred embodiments of the invention are described with respect to an exemplary text document 10 called doc1 as schematically shown in FIG. 1. As can be seen, the document 10 is structured by three nodes 10a, 10b and 10c, wherein the child nodes 10b and 10c comprise text in the form of sequences of words 20a-20c and 20d-20f, respectively. Although FIG. 1 shows only an extremely simple document 10, it should be appreciated that the present invention is especially advantageous in databases storing huge amounts of much more complex text documents with any number of nodes in arbitrary depth, each node possibly comprising thousands of words. The text documents 10 may be XML documents and the database storing the documents 10 may be a native XML database. However, it should be appreciated that the present invention covers any type of text documents 10 in a wide variety of formats, XML being only one example. Furthermore, in the example of FIG. 1, only the leaf nodes of the text document 10 comprise words. However, it should be appreciated that text documents 10 which comprise words in any level of the node tree are also supported, i.e. any node may comprise text, further child nodes or both. This is called "mixed content" and is especially advantageous in scenarios related to huge text documents.

In the following, a number of use cases, i.e. kinds of queries, as well as different prior art approaches for defining indexes supporting these use cases are presented. Furthermore, the efficiency of the database indexes according to the present invention are compared to these prior art approaches in the different use cases.

In the prior art, a simple query asking for documents containing the word "word1" would find the document 10 with little effort by using the following single-word-index:

| | |
|---|---|
| word1 | →doc1, →doc2, →doc3, . . . |
| word2 | →doc1, →doc2, →doc4, . . . |
| . . . | . . . |

As can be seen, the single-word-index stores single words as keys as well as pointers, i.e. references, towards documents which contain the words as values. The key/value-pairs may be sorted alphabetically.

Maintaining such an index, however, may make updating operations slower. Inserting a new document, for example, requires going through every word contained in the new document and adding the information that this word occurs in this document to the index.

Another common use case is a search for documents that contain a set of words in a predefined distance from each other, i.e. with a predefined maximum amount of words in between. The most frequent of these use cases is the search for two consecutive words, i.e. word-pairs with a distance of 0.

Such a query that looks for documents containing "word1" directly preceding "word2" could use the above single-word-index. First, the single-word-index would be scanned for "word1" and then another index-scan would be performed for "word2". In the example document 10 of FIG. 1, the single-word index would find the document 10 twice because it contains both words. Afterwards, the document 10 would need to be scanned in detail in order to find out if the words occur in the required sequence. However, such a document scan is time consuming and processing intensive, especially for large documents.

The use case may be handled more efficiently by an index that contains each pair of two consecutive words occurring in any document, i.e. a double-word-index. Although the resulting index table is bigger than the table of a single-word-index as shown above, the effort when inserting a document into the database is the same since a document contains as many word pairings as it contains words, given that the last word is preferably inserted as a pairing of (word, "end-token"). The index entries may be sorted alphabetically firstly by the first word and secondly by the second word, as depicted in the following exemplary prior art double-word-index:

| word1, word2 | →doc1, →doc2, ... |
| word2, word3 | →doc1, ... |
| ... | ... |

Queries looking for two consecutive words can be speeded up considerably using this index, since the double-word-index provides this information with only a single index lookup and no document scanning afterwards.

Queries for a single word as shown further above in the context of the single-word-index can be handled in the same way using the double-word-index, in that just the first entry that contains the required word in the first position of the key is retrieved.

It should be appreciated that the above presented concept may be expanded for indexes comprising word triplets or even larger tuples, accordingly.

A slight disadvantage when replacing a single-word-index with a double-word-index is that since the latter contains more elements in its keys, finding the appropriate key may take slightly longer. However, this drawback is acceptable, since the additional effort needed is far less than the cost of a document scan.

Both indexes discussed above retrieve words regardless of where they occur within the documents. Queries frequently, however, ask for documents that contain a word in a specific position If, for example, as depicted in FIG. 1, each document 10 of a certain collection consists of nodes 10a, 10b and 10c called A, A/B and A/C, respectively, a query might ask for documents that contain a specific word in an A node. An index that would directly support an efficient querying of this kind needs to contain pairings of words and a location specification, as depicted in the following word-structure-index according to the present invention:

| word1, A | →doc5, ... |
| word1, A/B | →doc1, →doc3, ... |
| word2, A | →doc2, ... |
| ... | ... |

The above word-structure-index would provide the information that "word1" occurs in doc1/A/B very efficiently with a single index scan. In contrast, the prior art single-word-index would only provide the information that "word1" is contained in doc1 somewhere and the document would subsequently need to be scanned in detail to find out in which of the nodes "word1" occurs, which is inefficient, as already explained above. The word-structure-index may be sorted first by the words alphabetically, and then by the structure elements in document order. This word-structure-index has a number of advantages.

First, the use case when looking for a single word regardless of the position within the document can still be handled efficiently by just looking for the first occurrence of an entry that contains this word.

Furthermore, the overhead for index maintenance when inserting a document is small. When a (word, document-pointer)-pair is inserted into the index, the position the word is currently found in is known, thus additionally adding the position information needs no further query steps.

Another common kind of query is asking for consecutive words at certain positions. Accordingly, the present invention facilitates the generation of indexes combining the double-word-index and word-structure-index. Since both extensions add little overhead to the index maintenance costs, the combination of both extensions has comparable maintenance costs. An example of such a combined double-word-structure-index according to the present invention is depicted below:

| word1, word2, A | →doc5, ... |
| word1, word2, A/B | →doc1, →doc3, ... |
| word2, word3, A | →doc2, ... |
| ... | ... |

The index may be ordered by the first word alphabetically, the second word alphabetically and then by the structure information in document order.

With the above depicted double-word-structure-index, a query asking for the sequence (word1, word2) at position A/B in doc1 can be handled very efficiently with a single index lookup. This index can still handle queries asking for single words at arbitrary positions by finding the first key that contains the respective word at the first position. Queries that look for consecutive words at arbitrary positions can be handled by finding the first entry that contains the words at the first and second position.

A disadvantage arises in the use case of looking for a single word at a specific position. The index lookup would try to find the first entry that contains the word at the first position and the appropriate structure information in the third position. In other words, all index entries that start with the word currently searched for must be looked at. This is rather disadvantageous, since in databases holding text documents with large text contents, a certain word can occur very often with different successors and thus the set of index entries staring with a single word may be very large.

Therefore, a presently preferred embodiment of the invention provides an index whose keys are ordered to contain the structure information in the middle.

Referring to FIG. 1, a table showing an index. Each entry 50 of the index includes a key 51 and a value 52. The key 51 of the index further includes a subset of words 510 that occur in at least one of the nodes (e.g., 10a) of the exemplary text document 10. The key 51 may also include the name 511 of the respective node (e.g., 10a). The value 52 includes at least one reference 520 to the exemplary text document in which the subset of words 520 occur.

A table is also shown below:

| word1, A, word2 | →doc5, ... |
| word1, A, word3 | →doc6, ... |
| word1, A/B, word2, | →doc1, →doc3, ... |
| word2, A, word3 | →doc3, ... |
| ... | ... |

This word-structure-word-index is preferably ordered by the first word alphabetically, the structure information in document order and the second word alphabetically.

This preferred index structure is very efficient when handling queries for sequences of words in a specific position and queries for single words in arbitrary positions, similarly to the double-word-index presented above. Additionally, queries for a single word at a specific position can find the appropriate index entry also very efficiently, it is the first entry with suitable word at the first position and suitable structure information at the second position.

On the other hand, the use case of looking for word-pairings regardless of the position seems slightly less efficient as with the above double-word-structure-index. Such a query would with the word-structure-word-index need to look at every entry that contains the respective word in the first position and must scan these entries for their third entry. This disadvantage, at a closer look however, is minimal for two reasons:

Firstly, the number of entries that have to be scanned is typically small since it must by definition be smaller than the number of nodes occurring before the node currently searched for in document order. The number of nodes occurring in a document is in general much smaller than the number of words occurring subsequent to a specific word in a collection of text documents.

Secondly, if the database maintains a structure index, i.e. information about which nodes actually occur both in a specific document and in a collection of documents, the query execution engine can easily lookup which (and especially how many) entries must maximally be inspected on account of a query. Thus, the engine can optimize the query much better for best performance. A structure index helpful in this context is e.g. defined in the U.S. Pat. No. 7,051,016 of Applicant.

Although the above examples only show indexes according to the present invention which comprise pairs of consecutive words, it should be appreciated that the advantageous concepts can easily be expanded for indexes serving queries for any number of words with a defined distance.

In summary, the present invention defines an advantageous indexing structure combining text and structure information, which facilitates a very efficient information retrieval especially in large text document collections. Moreover, indexes defined according to the present invention in the form of simple, well-proven list-based indexes are very efficient even when used in different scenarios, comprising queries for single words in arbitrary positions, single words in specific document positions, multiple words in arbitrary positions as well as multiple words in specific positions.

The invention claimed is:

1. A non-transitory computer readable medium storing computer executable instructions for execution by a computing system, the stored instructions being executable to cause the computing system to at least:
    execute a database indexing process on a plurality of text documents where each entry in the database index comprises:
        a key comprising a subset of words occurring in at least one hierarchical node of at least one of the plurality of documents and a data value associated with the respective hierarchical node, wherein the subset of words is separated into multiple elements within the key that comprise at least one word in the subset of words and a remainder of the subset of words; and
        a value comprising one or more references to the text documents in which the subset of words of the respective entry occurs,
        wherein the at least one word in the subset of words is the first element in the key.

2. The computer readable medium of claim 1, wherein the at least one word in the subset of words is a first word and the key is structured in the following order: the first word of the subset of words, the data value associated with the respective hierarchical node, and the remainder of words of the subset of words, the remainder including at least one word.

3. The computer readable medium of claim 1, wherein the entries are sorted by a first word of the subset of words in a first alphabetical order, by the data value associated with the respective hierarchical node in a document order, and/or by the remainder of words of the subset of words in a second alphabetical order.

4. The computer readable medium of claim 1, wherein the at least one word and the remainder of the subset of words are a predefined distance from each other within the at least one of the plurality of documents.

5. The computer readable medium of claim 4, wherein the at least one word and the remainder of the subset of words are consecutive words within the at least one of the plurality of documents.

6. The computer readable medium of claim 1, wherein the data value in each key comprises a path of the respective hierarchical node.

7. The computer readable medium of claim 6, wherein the path starts from a root node of the text document.

8. The computer readable medium of claim 1, wherein only a part of the hierarchical nodes of the text documents is indexed.

9. The computer readable medium of claim 1, wherein all of the hierarchical nodes of the text documents are indexed.

10. A computer implemented method for generating a database index on a computer processing system for indexing a plurality of text documents in a database, the method comprising:
    execute a database indexing process on the plurality of text documents;
    creating, by using the computer processing system, a key-value pair, the key including a subset of words from one of the plurality of text documents and a reference to a hierarchical node of the one of the plurality of text documents, the value of the key-value pair including a document reference, wherein the subset of words is separated into multiple elements within the key that comprise at least one word in the subset of words and a remainder of the subset of words;
    setting the reference to the hierarchical node to a data value related to the hierarchical node that is associated with the subset of words from one of the plurality of text documents; and
    linking the document reference to the one of the plurality of text documents that includes the subset of words,
    wherein the at least one word of the subset entry of words as a as the first element for the key.

11. The method of claim 10, wherein the key is structured in the following order: a first word of the subset of words, the reference to the hierarchical node, and the remainder of words of the subset of words.

12. A non-transitory computer readable medium storing instructions for implementing a method of claim 10.

13. A database system that includes a database index for indexing text documents, the system comprising:
    a non-transitory computer readable storage medium configured to store a plurality of text documents, the plurality of text documents including one or more hierarchical nodes that comprise one or more words; and
    a computer processing system configured to:
    execute an indexing process on the plurality of text documents;
    as part of the indexing process, create a key based on a subset of words found in one of the plurality of text documents, the key including a subset of words that occurs in a hierarchical node of the one of the plurality of text documents, and a name entry that is associated with the hierarchical node that includes the subset of words, wherein the subset of words is separated into multiple elements within the key and comprises, as the first element of the key, at least one word in the subset of words, and a remainder of the subset of words as another element within the key; and associate, to the created key, a value that references to the one of the plurality of text documents that includes the hierarchical node with the subset of words, wherein the remainder of words includes at least one word.

14. The database system of claim 13, wherein the plurality of documents are XML documents.

15. The database system of claim 13, further comprising a structure index.

16. The database system of claim 13, wherein the key is structured in the following order: the at least one word in the subset of words, the name entry that is associated with a hierarchical node that includes the subset of words, and the remainder of words from subset of words.

* * * * *